US010132823B2

(12) United States Patent
Giunta et al.

(10) Patent No.: US 10,132,823 B2
(45) Date of Patent: Nov. 20, 2018

(54) METHOD AND SYSTEM FOR THE CONTINUOUS REMOTE TRACKING OF A PIG DEVICE AND DETECTION OF ANOMALIES INSIDE A PRESSURIZED PIPELINE

(71) Applicant: ENI S.p.A., Rome (IT)

(72) Inventors: Giuseppe Giunta, San Donato Milanese (IT); Giancarlo Bernasconi, Malnate (IT); Silvio Del Giudice, Seregno (IT)

(73) Assignee: ENI S.p.A., Rome (IT)

( * ) Notice: Subject to any disclaimer, the term of this patent is extended or adjusted under 35 U.S.C. 154(b) by 309 days.

(21) Appl. No.: 14/711,885

(22) Filed: May 14, 2015

(65) Prior Publication Data
US 2015/0331007 A1 Nov. 19, 2015

(30) Foreign Application Priority Data
May 14, 2014 (IT) .............................. MI2014A0883

(51) Int. Cl.
*G01M 7/02* (2006.01)
*G01M 3/18* (2006.01)
(Continued)

(52) U.S. Cl.
CPC .............. *G01P 3/64* (2013.01); *G01M 3/005* (2013.01); *G01M 3/246* (2013.01); *G01P 3/24* (2013.01);
(Continued)

(58) Field of Classification Search
CPC .. G01P 3/64; G01P 3/24; G01C 21/00; G01M 3/005; G01M 3/243; G01M 3/246; G01S 5/22; G01V 1/001; F16L 55/48
(Continued)

(56) References Cited

U.S. PATENT DOCUMENTS 4,590,799 A    5/1986  Brown et al.
5,417,112 A    5/1995  Rosenberg
                (Continued)

FOREIGN PATENT DOCUMENTS

CA    2 728 818 A1    12/2009
GB    2462096 A   *  1/2010  .............. F16L 55/48
                (Continued)

OTHER PUBLICATIONS

Eurasian Search Report dated Sep. 16, 2015 in Patent Application No. 201590704 (with English language translation).
(Continued)

*Primary Examiner* — Ly D Pham
(74) *Attorney, Agent, or Firm* — Oblon, McClelland, Maier & Neustadt, L.L.P.

(57) ABSTRACT

A method and system are described for the continuous remote monitoring of the position and advance speed of a pig device inside a pipeline suitable for transporting a pressurized fluid, wherein the pipeline consists of a plurality of pipe sections joined to each other by welding. The method comprising the following steps: continuous acquisition and registration, by a plurality of measurement stations equipped with vibroacoustic sensors discretely located along the pipeline, of vibroacoustic signals due to hydraulic pressure transients, and/or to the vibrations generated by the pig device in movement in the contact/friction phases on the welding seams, and/or to other physical variations of the pipeline; analysis and processing, by a centralized control unit, of the vibroacoustic signals registered by the measurement stations to reveal, identify and reference the hydraulic/acoustic transients produced by the pig device during contact/friction with the weldings and/or with other variations in the internal section of the pipeline; continuous calculation of the linear position and advance speed of the pig device in
(Continued)

relation to the time lapse between the vibroacoustic signals registered by at least two measurement stations installed along the pipeline.

15 Claims, 15 Drawing Sheets

(51) Int. Cl.
 G01P 3/24 (2006.01)
 G01H 7/00 (2006.01)
 F16L 55/26 (2006.01)
 G01P 3/64 (2006.01)
 G01V 1/00 (2006.01)
 G01S 5/22 (2006.01)
 G01M 3/00 (2006.01)
 G01M 3/24 (2006.01)
 F16L 55/48 (2006.01)

(52) U.S. Cl.
 CPC .............. *G01S 5/22* (2013.01); *G01V 1/001* (2013.01); *F16L 55/48* (2013.01)

(58) Field of Classification Search
 USPC .......................................................... 702/56
 See application file for complete search history.

(56) References Cited

U.S. PATENT DOCUMENTS

| | | | | |
|---|---|---|---|---|
| 5,460,046 A * | 10/1995 | Maltby | ............... | G01N 29/09 73/623 |
| 5,549,000 A * | 8/1996 | Brown | ............... | G01V 1/001 73/587 |
| 6,082,193 A * | 7/2000 | Paulson | ............... | G01M 3/243 73/152.58 |
| 8,620,602 B2 * | 12/2013 | Alonso | ............... | F17D 5/06 702/52 |
| 2003/0161428 A1 * | 8/2003 | Garrett | ............... | H04L 27/2675 375/368 |
| 2003/0192693 A1 * | 10/2003 | Wellington | ............... | E21B 41/0064 166/267 |
| 2004/0089358 A1 * | 5/2004 | Burd | ............... | F16L 55/179 138/98 |
| 2010/0135447 A1 * | 6/2010 | Sapozhnykov | ............... | H04L 27/2675 375/362 |
| 2011/0103189 A1 * | 5/2011 | Paulson | ............... | F16L 55/48 367/89 |
| 2011/0139538 A1 | 6/2011 | Hill et al. | | |
| 2011/0149688 A1 | 6/2011 | Hill et al. | | |
| 2011/0162454 A1 * | 7/2011 | Paulson | ............... | G01N 29/043 73/592 |
| 2011/0313671 A1 * | 12/2011 | Nedilko | ............... | B61K 9/08 702/14 |
| 2012/0106676 A1 * | 5/2012 | McCallister | ............... | H03F 1/0266 375/297 |
| 2012/0137781 A1 | 6/2012 | Hill et al. | | |
| 2012/0210793 A1 * | 8/2012 | Daton-Lovett | ............... | E21B 47/0001 73/570 |
| 2012/0243376 A1 * | 9/2012 | Dalmazzone | ............... | F17D 5/06 367/127 |
| 2013/0096393 A1 * | 4/2013 | Osorio | ............... | A61B 5/726 600/301 |
| 2013/0223565 A1 * | 8/2013 | McCallister | ............... | H04L 25/03343 375/297 |
| 2014/0009598 A1 * | 1/2014 | O'Donnell | ............... | G01M 3/005 348/84 |
| 2014/0025319 A1 * | 1/2014 | Farhadiroushan | ............... | G01S 5/186 702/56 |
| 2014/0165731 A1 * | 6/2014 | Linford | ............... | G01M 3/243 73/592 |
| 2015/0300907 A1 * | 10/2015 | Giunta | ............... | G01H 1/00 702/39 |
| 2015/0323119 A1 * | 11/2015 | Giunta | ............... | G01N 29/07 73/597 |
| 2016/0341583 A1 * | 11/2016 | Stencel | ............... | G01F 1/666 |

FOREIGN PATENT DOCUMENTS

WO WO 2009/067769 A1 6/2009
WO WO 2009067769 A1 * 6/2009 ............... F17D 3/08

OTHER PUBLICATIONS

Italian Search Report dated Jan. 22, 2015 in Italian Application MI20140883, filed on May 14, 2014 ( with English Translation of Categories of Cited Documents).
U.S. Appl. No. 14/652,245, filed Jun. 15, 2015, Giunta, et al.

* cited by examiner

METHOD AND SYSTEM FOR THE CONTINUOUS REMOTE TRACKING OF A PIG DEVICE AND DETECTION OF ANOMALIES INSIDE A PRESSURIZED PIPELINE

The present invention relates to a method and system for the continuous remote monitoring, in passive mode, of inspection or pigging operations of pipelines used for transporting pressurized fluids, in particular for detecting, in real time, the position and advance speed of a pig device inside the pipeline, any possible damage and/or malfunctioning of the pig device, any possible anomaly of the internal section of the pipeline and any possible blockage positions of the pig device.

The method and system according to the invention envisage the installation of equipment suitable for the purpose along the pipeline, equipped with vibroacoustic sensors (hydrophones in contact with the fluid and/or accelerometers/geophones in contact with the wall of the pipe), the transmission of data and processing of the signals on the part of a control unit. The continuous monitoring method and system can be applied to pipelines for the transportation of pressurized fluids, generally long-distance oil-pipelines and gas-pipeline of international strategic importance.

Technologies currently known for monitoring during pigging operations of pipelines used for the transportation of pressurized fluids envisage the identification of the sound waves generated by the friction between the disks of the pig device and the welding seams of the pipeline, or they require the installation of suitable active transmitters of the acoustic and/or electromagnetic type on the pig device. Other detection techniques of the position, in the event of a blockage in the pig device, envisage the generation of hydraulic transients on one side of the pipeline and the measurement of the propagation times in the free section of the same pipeline.

The document WO 2010/010318 describes a method based on the detection of the noise generated by the pig device in movement during its passage in the proximity of a series of vibroacoustic sensors located along the pipeline and positioned at a short distance from the pipe. This document, however, does not describe analysis techniques in real time of the signals, neither is the noise generated by the pig device passively exploited for identifying malfunctionings of the same and/or physical anomalies of the pipeline.

The documents GB 2305989, U.S. Pat. No. 4,541,278 and GB 2394549 describe systems which use the vibrations produced by the pig device for tracking it inside the pipeline. These systems, however, perform the physical analysis of the pipeline (corrosion, flaws, etc.) with "ad hoc" instrumentation installed onboard the pig device. The position of the pig device is reconstructed a posteriori by processing the data collected during the pigging operations.

The document U.S. Pat. No. 5,417,112 proposes the installation of a pair of sensors (geophones and/or magnetometers) at a known distance along a pipeline for identifying the passage of the pig device and its movement speed during the passage in the proximity of the same sensors. This document also describes the possibility of measuring the time between the signals produced by the pig device in the passage through consecutive weldings, positioned at a known distance, for measuring the movement speed of the pig device itself. In U.S. Pat. No. 5,417,112, however, processing techniques that envisage a cross-correlation between the two geophones for accurate localization in intermediate positions, are not used.

The document U.S. Pat. No. 4,590,799 proposes tracking a pig device with the use of two geophones in contact with the pipeline at a known distance, and the activation of trigger signals in correspondence with the passage of the pig device in the proximity of said geophones.

The document U.S. Pat. No. 2,820,959 envisages the use of an active source of electromagnetic waves assembled on the pig device and an external detection apparatus of these waves for localizing said pig device.

The document EP 0122704 proposes localizing the pig device by identifying its passage through two section variations, predefined and geolocated a priori along the route of the pipeline.

The document US 2011/0139538 describes the use of a series of acoustic sensors distributed along the pipeline, using optical fibre, for determining the position of the pig device at each moment. The method is effective and accurate in the localization but requires the presence of a continuous series of sensors along the route of the pipeline.

The document US 2011/0282591 envisages the installation of RFID (acronym of "Radio Frequency IDentification") sensors along the pipeline.

The document U.S. Pat. No. 5,549,000 proposes an analysis of the noise generated by the pig device during its movement for determining the conditions of the same pig device and/or of the pipeline. The system envisages the installation of accelerometers on the walls of the pipe for measuring, at the moment of passage of the pig device, the vibrations generated by the pig device itself and which interact with the pipe/fluid system. The estimation of the conditions of the system is localized around the sensor (in the order of tens of meters).

The document US 2011/0301882 describes the use of accelerometers/hydrophones for the registration and continuous analysis of the passive noise (ultrasounds having a frequency in the order of 1 MHz) generated by the flow and/or by the pig device in movement for obtaining the percentage of solids (sands) contained in the fluid being transported.

Finally, the document WO 2009/067769 envisages the positioning of hydrophonic sensors along the pipeline and the insertion, in the body of the pig device, of an apparatus capable of generating a pressure transient, such as, for example, the fast opening of a by-pass valve, between the two sides of the pig device. The pressure transient is revealed by the hydrophones positioned at the two sides of the pig device and, by processing the arrival times of the waves at the hydrophones, the position of said pig device is obtained.

Numerous patent documents according to the known art generally envisage the detection (acoustic and/or electromagnetic) of the pig device at the moment of its passage in correspondence with sensors suitably located along the pipeline and therefore the interpolation of the position of said pig device in intermediate positions using those already detected. The measurement precision can consequently only be increased by reducing the distance between the sensors and/or increasing their number. Similar techniques are sued for the localization of acoustic sources not in movement, for example in the localization of a leakage point in a pipeline as described in the document U.S. Pat. No. 4,289,019.

An objective of the present invention is therefore to provide a method and system for the continuous remote monitoring of inspection or pigging operations of pipelines used for transporting pressurized fluids which is capable of solving the drawbacks of the known art mentioned above, in an extremely simple, economical and particularly functional manner.

More specifically, an objective of the present invention is to implement techniques for localizing acoustic sources not in movement, by suitably calibrating the time cross-correlation parameters, in order to extend them to a source in movement. The distance between the sensors is therefore only influenced by the necessity of being capable of registering the signals emitted by the pig device. The nature of the signals is low-frequency (less than 100 Hz) and the sensors can also be positioned at a distance of various tens of kilometers for pipelines having a diameter greater than 8"-10".

The method according to the invention continuously reconstructs the position and the speed of the pig device by processing the vibroacoustic signals emitted from the pig device itself, using cross-correlation techniques of sliding time windows. The signals are registered by at least two sensors positioned at opposite sides with respect to the position of the pig device. The method according to the invention also proposes strengthening the estimation of the possible anomalies of the pig device and/or pipeline also using the count of acoustic events generated by the passage of said pig device through the weldings of the pipe, which are positioned at known distances.

As far as the detection of anomalies of the pig device and/or pipeline are concerned, the methods and systems according to the known art generally effect an analysis of the vibroacoustic signals generated by the pig device and/or flow of fluid and registered by appropriate sensors (typically accelerometers). In this way, the medium/high frequencies of the signal emitted are processed, in the order of kHz if generated by the pig device and in the order of MHz if generated by the flow of fluid passing inside the pipeline. The area of pipeline being examined is limited to around each sensor, or, in other words, at a distance of less than 10 meters from each sensor.

The method according to the present invention, without excluding the possibilities offered by the methods according to the known art, proposes, on the other hand, an analysis of the repeatability of the waveforms generated by the pig device in the friction phase of the welding seams in order to identify anomalies of the welding and/or of the pig device itself, also at a distance of several kilometers. As the vibroacoustic signal undergoes an attenuation during its propagation inside the pipeline, the method according to the invention proposes equalizing the signals registered, before comparing them, by compensating of the propagation effects according to the proper physic-mathematical models, whose parameters are calibrated with experimental measurements that re-exploit the vibroacoustic signals inside the pipe (see, in this respect, international patent application PCT/EP2013/077116 in the name of the same applicant).

Further objectives of the method and system according to the present invention are:
  integration of the processing procedures for the continuous remote tracking of the pig device and the detection of the physical anomalies by exploiting the same signal emitted by the pig device; and
  the use of techniques for the estimation and reduction of the noise present, as for example the pressure transients generated by pumps/compressors, based on the direction of propagation of the signal, thus increasing the sensitivity (signal/noise ratio) towards the vibroacoustic signal emitted by the pig device (see international patent application PCT/EP2013/077116 in the name of the same applicant).

These objectives according to the present invention are achieved by providing a method and system for the continuous remote monitoring of inspection or pigging operations of pipelines used for the transportation of pressurized fluids as specified in the independent claims.

Further characteristics of the invention are indicated by the dependent claims, which are an integral part of the present description.

In general, the method and system according to the invention combine the continuous remote tracking techniques of the pig device during the inspection, with the detection techniques of anomalies of the same pig device, and also the pipeline under examination. Time domain cross-correlation procedures of the vibroacoustic signals are used for obtaining an accurate localization of the pig device also at distances reaching tens of kilometers from the sensors installed along the pipeline.

The method and system according to the invention therefore envisage:
  the cooperative/joint use of detection by means of time cross-correlation of the vibroacoustic signals and count of the emissions on the welding seams between the various sections of pipe forming the pipeline;
  the continuous passive measurement of the propagation parameters of acoustic pressure transients in the various section of pipe forming the pipeline, in order to equalize the waveforms generated by the pig device during the passage through the welding seams; and
  implementation of reduction procedures of the acoustic noise in the pipeline (compression/pumping transients) through the separation of the various components of the pressure signals coming from propagation directions.

The characteristics and advantages of a method and system for the continuous remote monitoring of inspection or pigging operations of pipelines used for transporting pressurized fluids according to the present invention will appear more evident from the following illustrative and non-limiting description, referring to the enclosed schematic drawings, in which.

Figure 2:
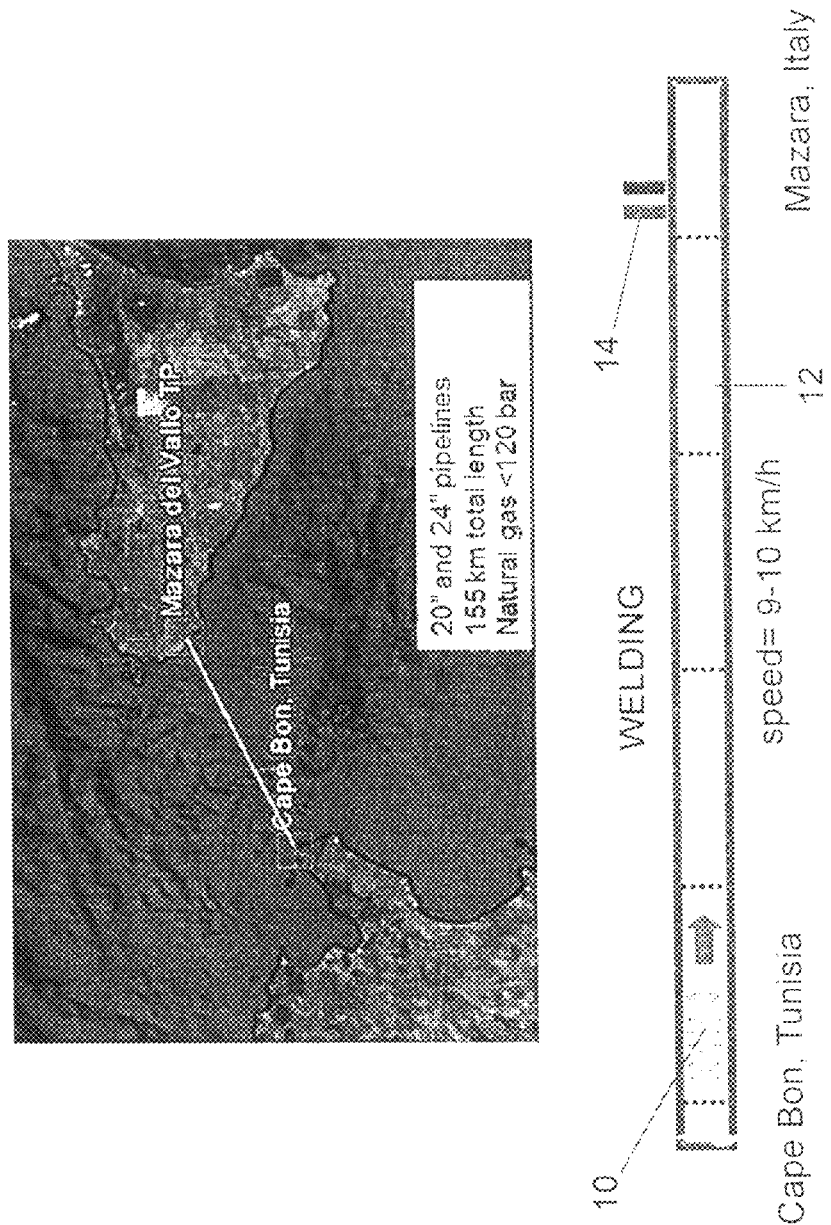
FIG. 2 shows a map and layout of an underwater pipeline for the transportation of gas between Tunisia and Sicily, with pipelines having a diameter of 20" and 24" and with a length equal to 155 km.
Figure 3:
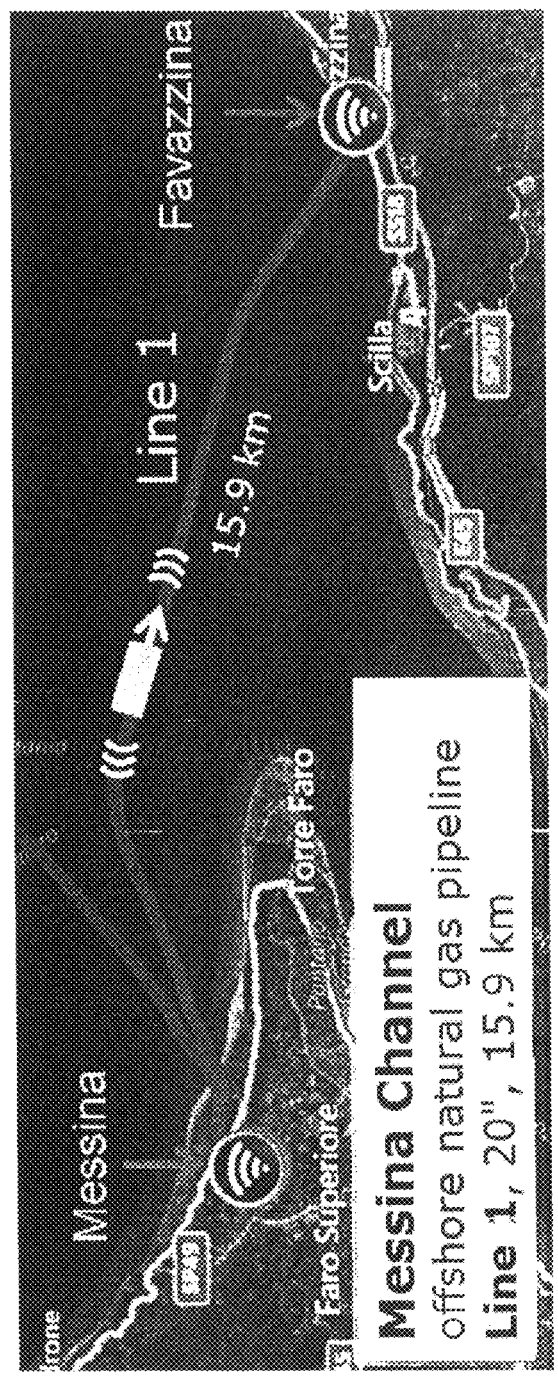
FIG. 3 shows a map and layout of an underwater pipeline for the transportation of natural gas between Sicily and Calabria, with pipelines having a diameter of 20" and with a length equal to 15.9 km.
Figure 5:
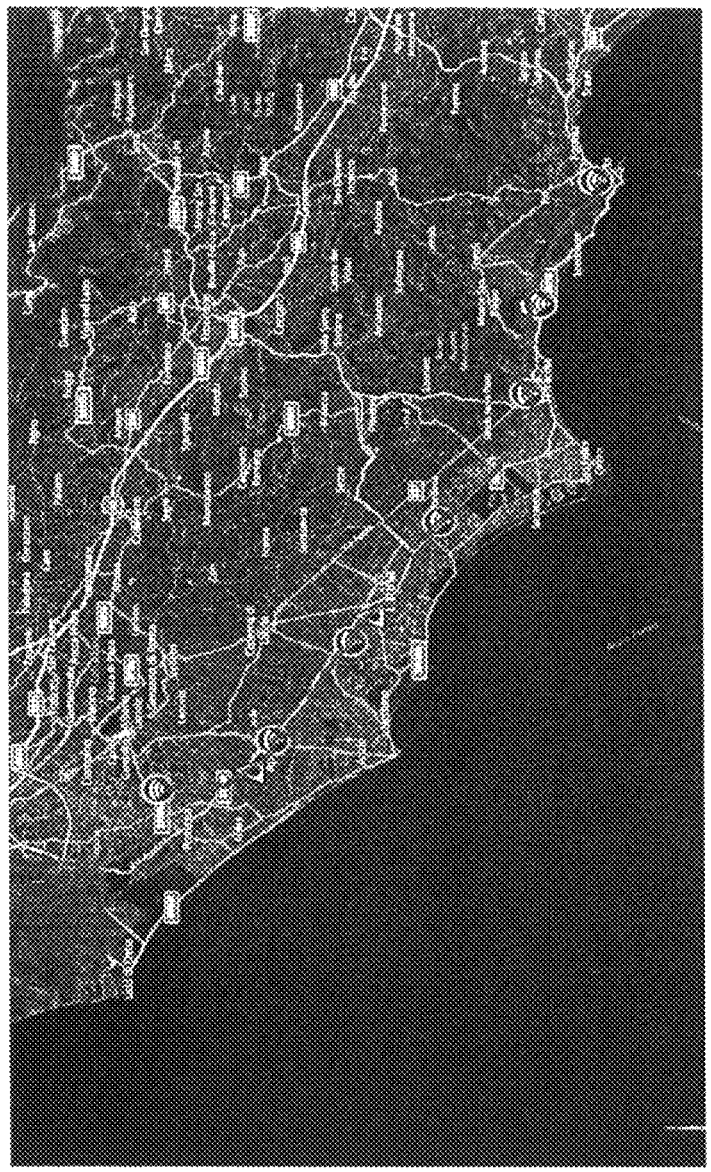
FIG. 5 shows a map and layout of a pipeline for the transportation of refined oil products between Gaeta and Pomezia, with pipelines having a diameter of 16" and with a length equal to 112 km.
Figure 6:
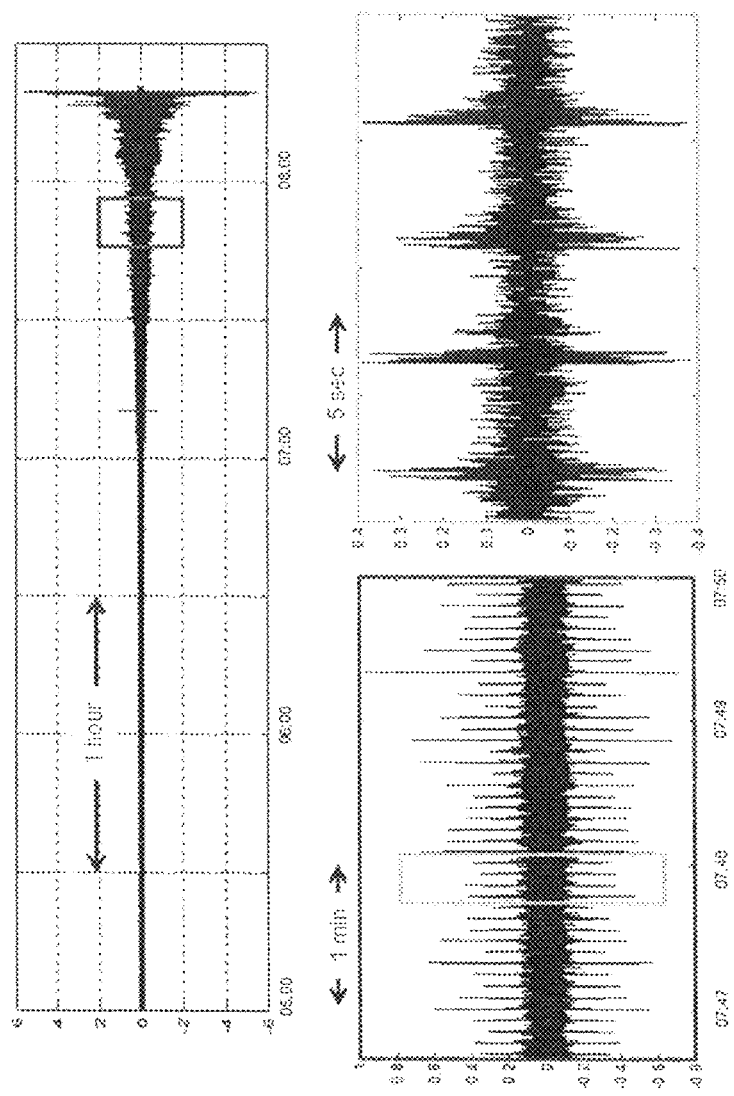
Figure 7:
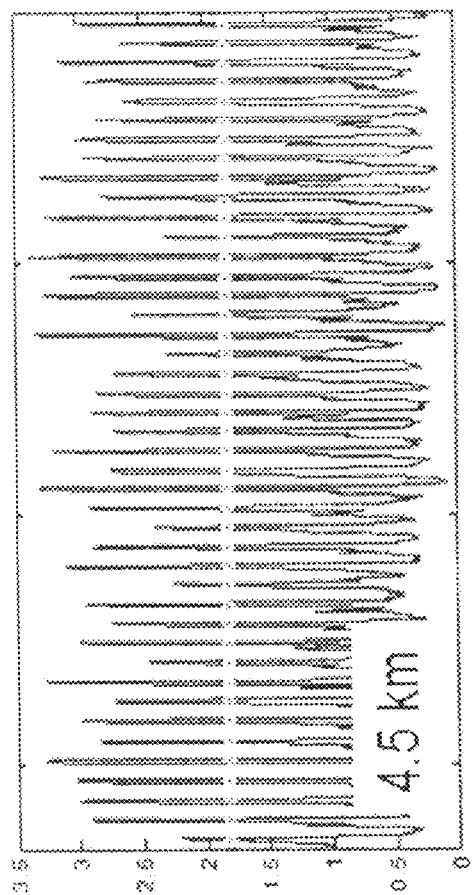
Figure 8:
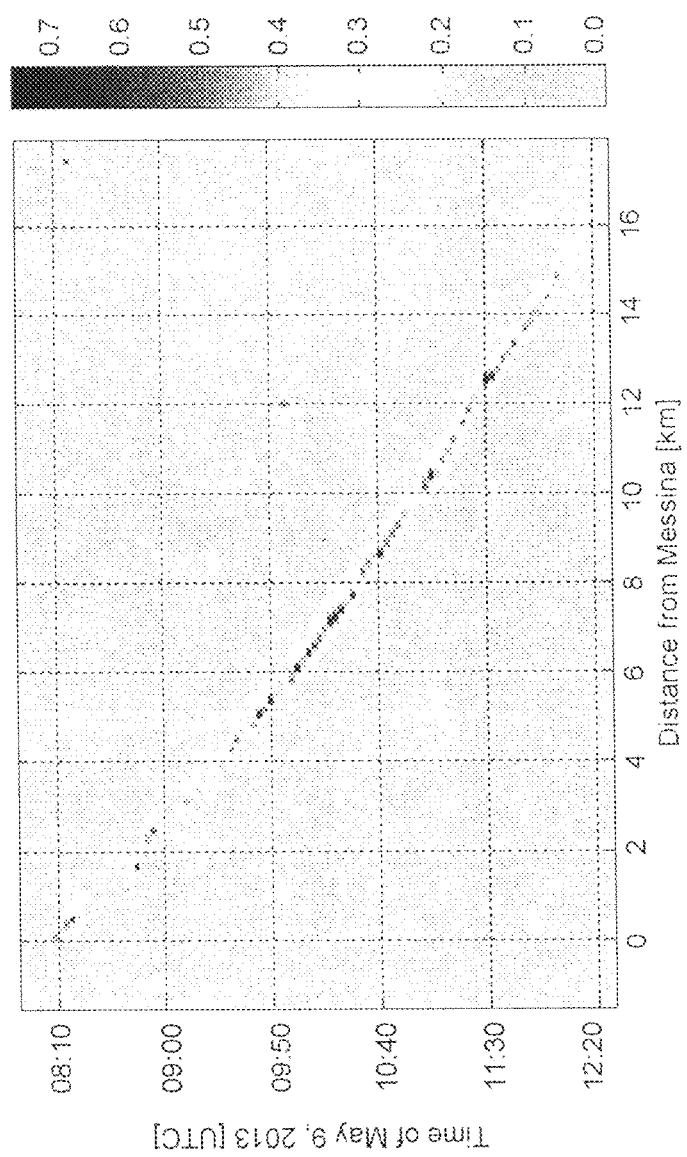
Figure 9:
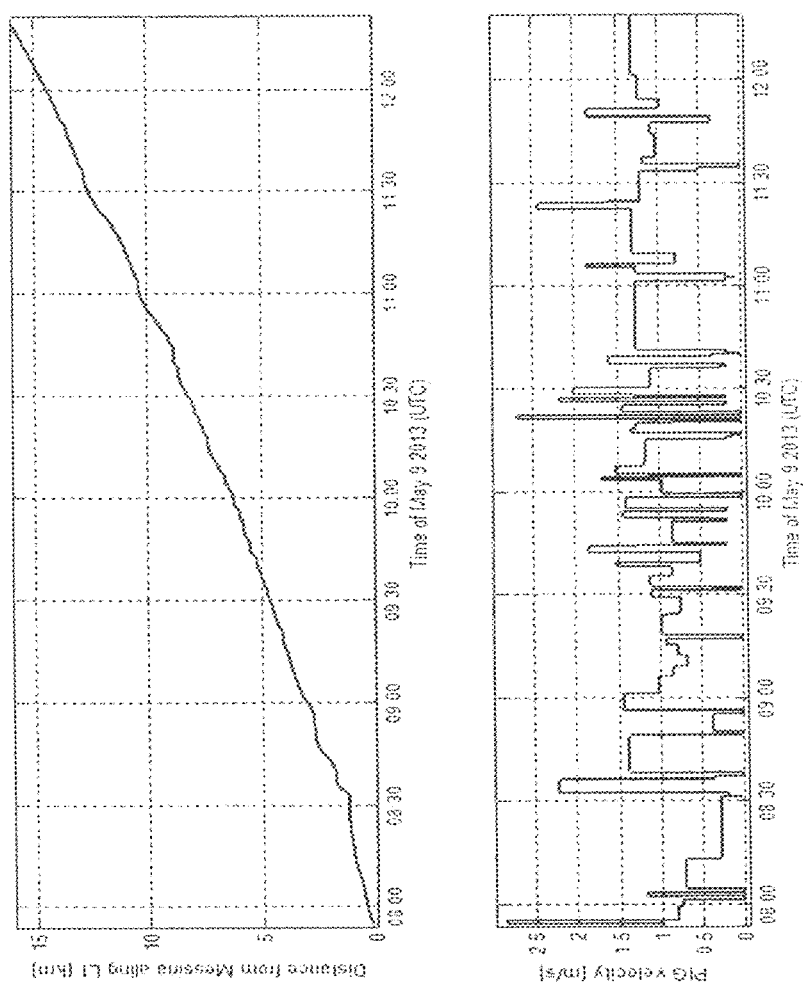
Figure 10:
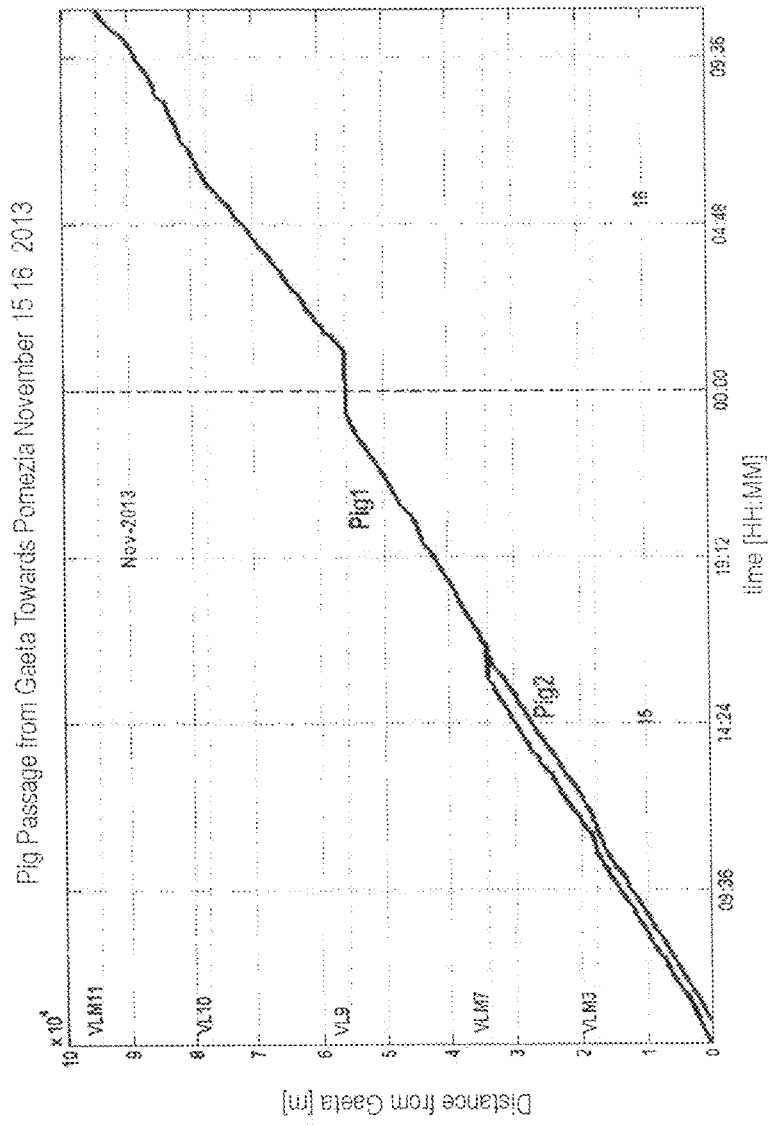
Figure 11:
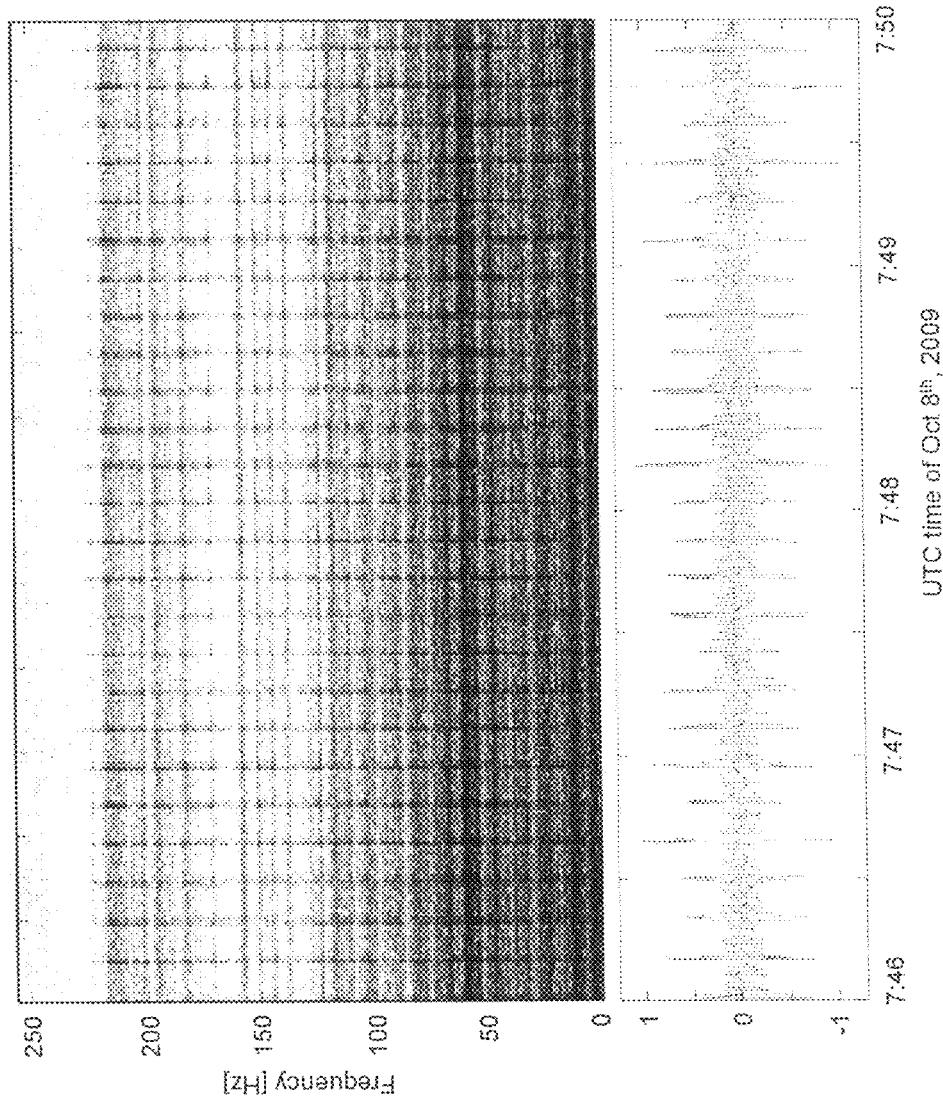
Figure 12:
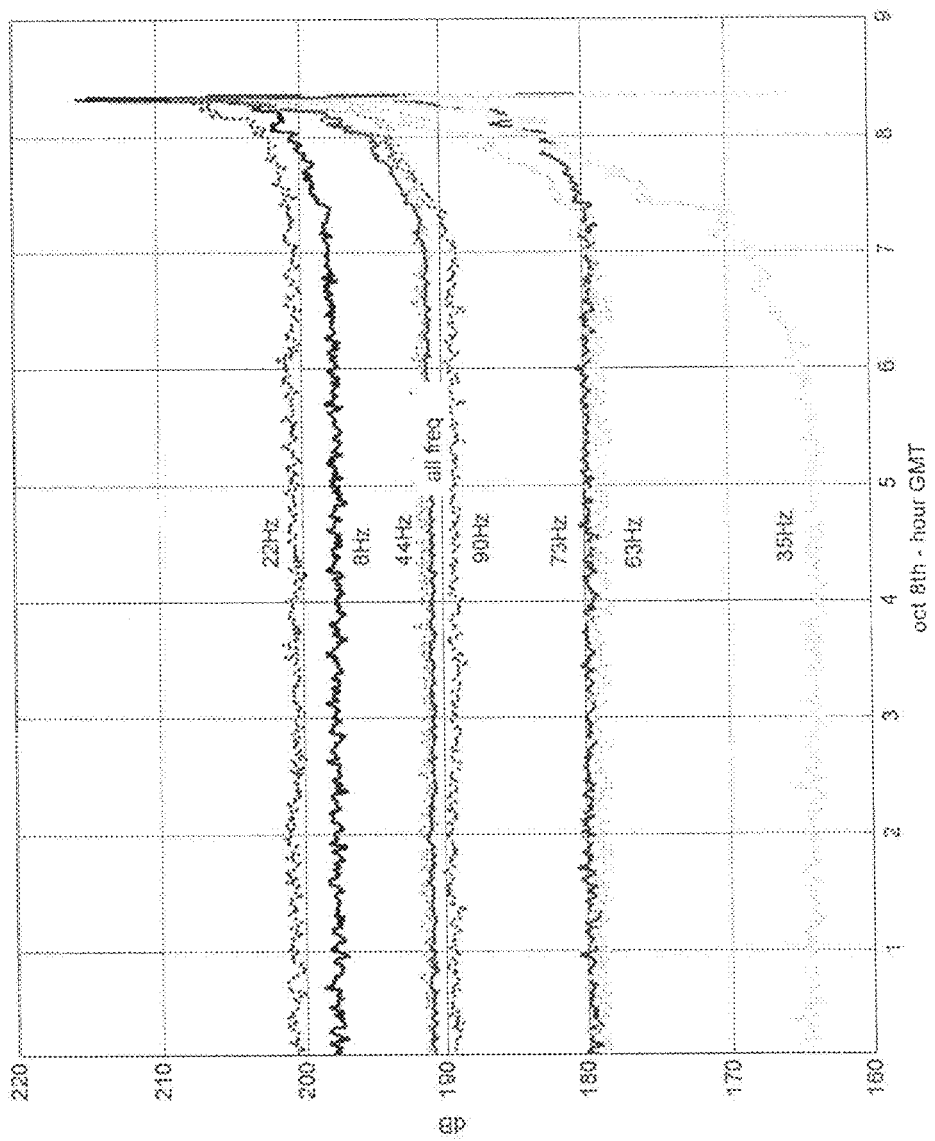
Figure 13:
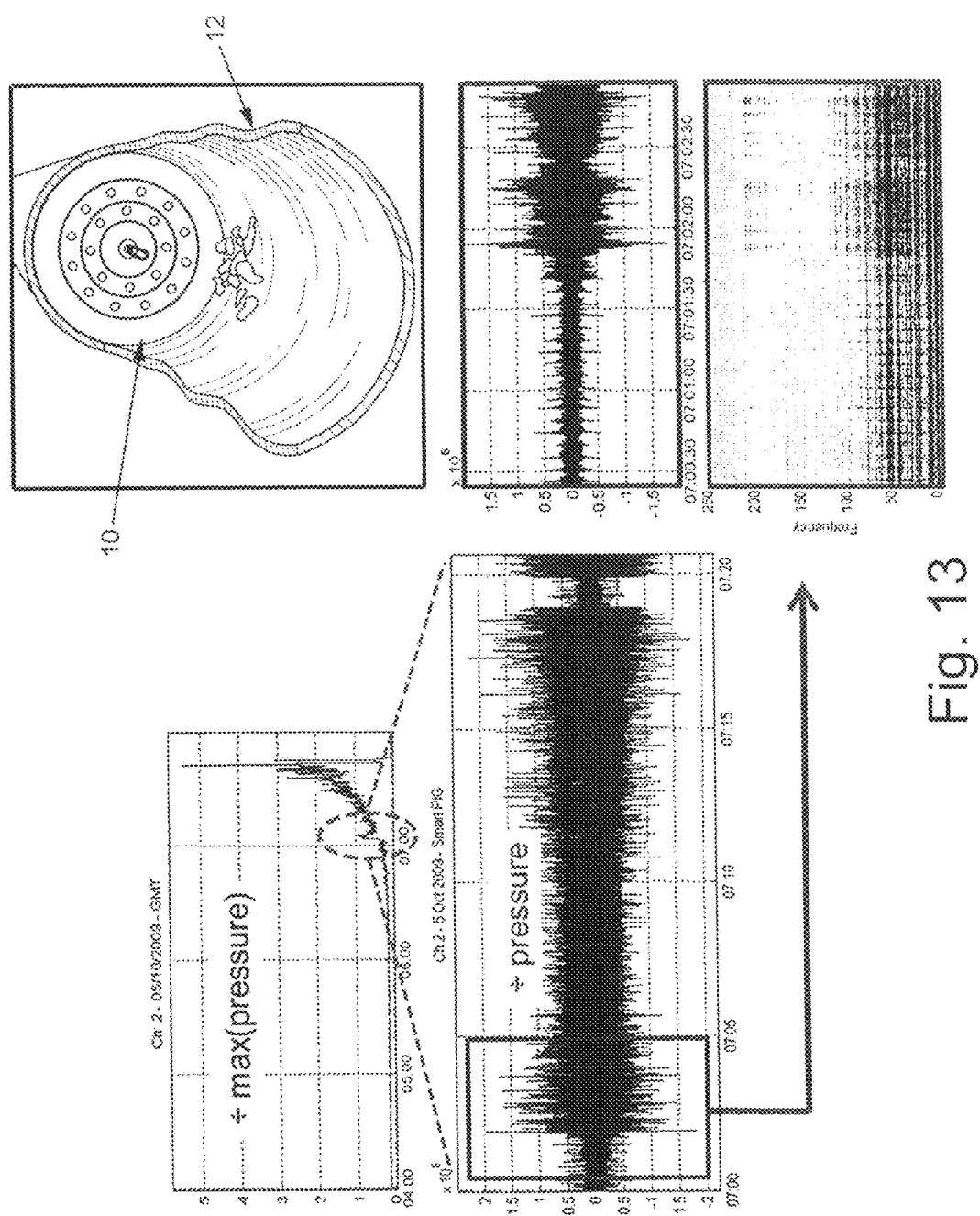
Figure 14:
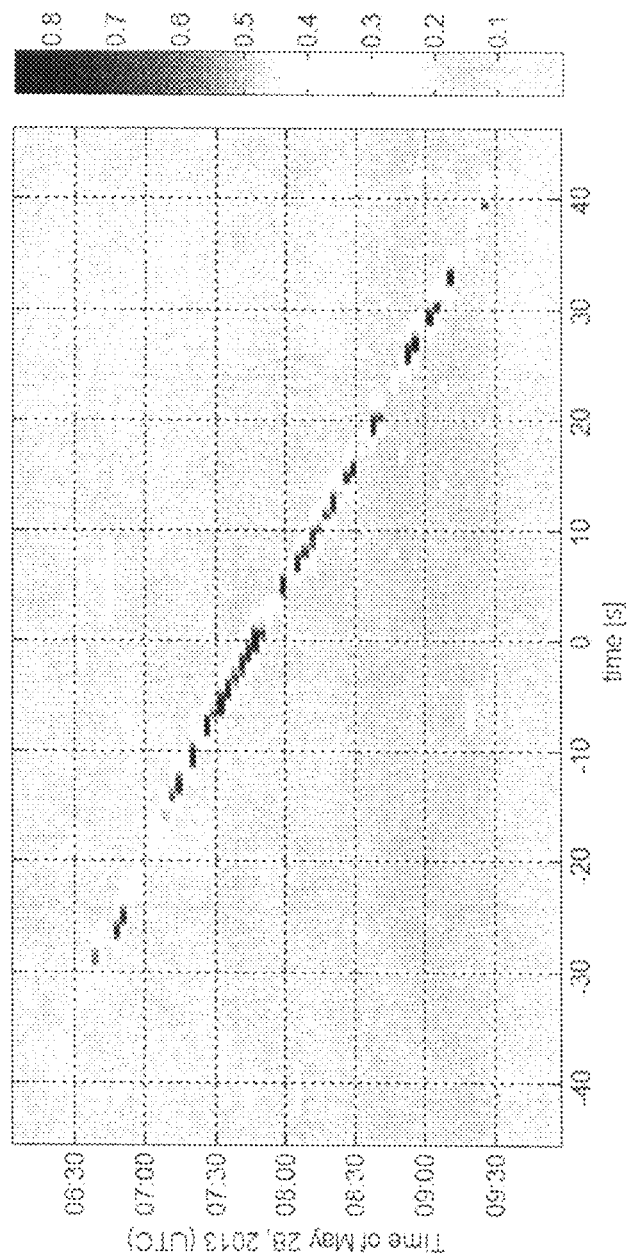
Figure 15:
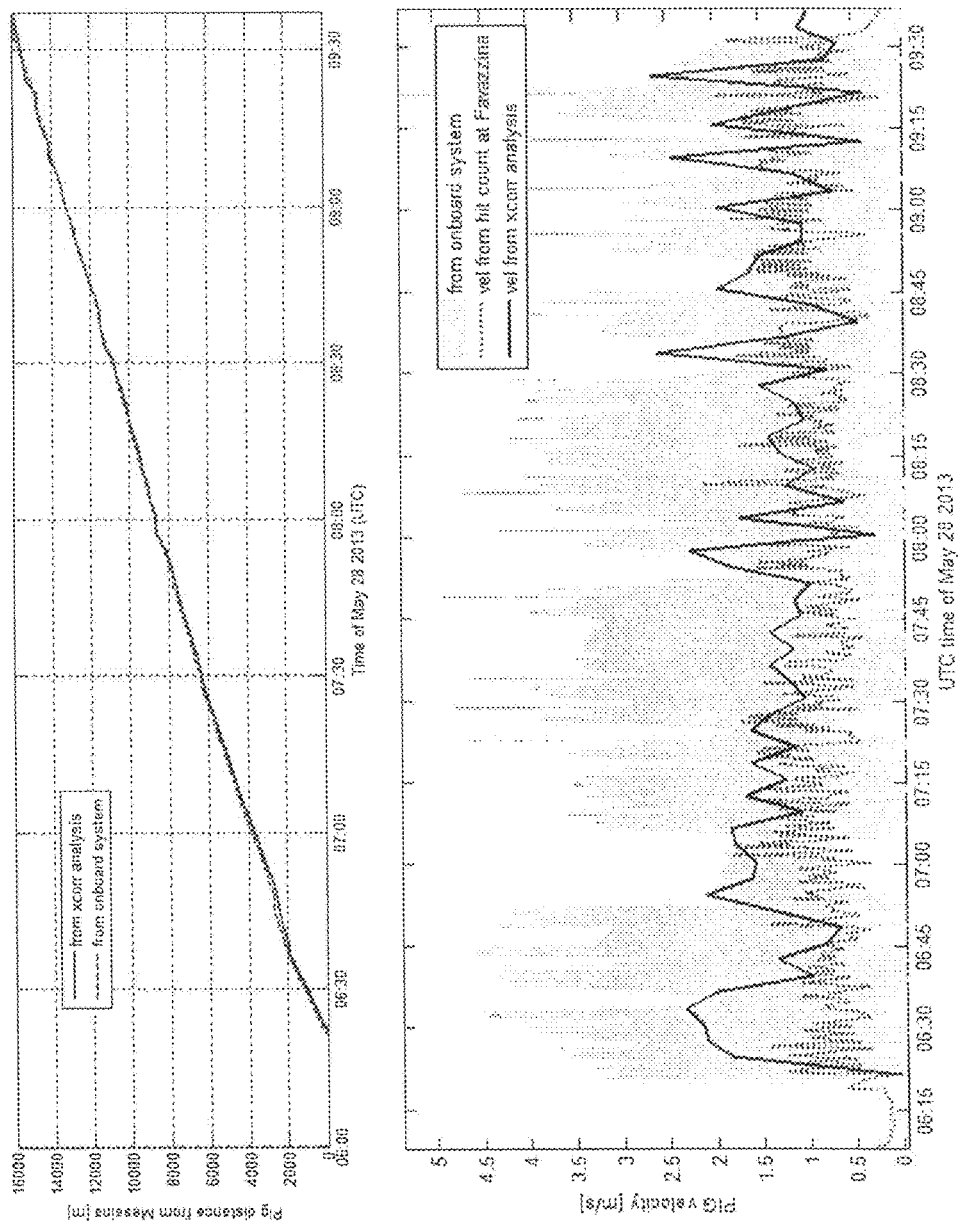

FIG. 6 shows the diagrams of the pressure signal in correspondence with the arrival terminal (Sicily) of the gas pipeline of FIG. 2 during the approach phase of a pig device at different time zoom levels. In particular, it shows the acoustic waveforms regularly generated by the pig device while passing through the welding seams relating to single sections of pipeline 12 meters long, with an increase in amplitude by decreasing the distance towards the arrival terminal;

FIG. 7 is a diagram which shows the pressure signal at the arrival terminal (Sicily) of the gas pipeline of FIG. 2 during the approach phase of a pig device. The example of "STA-LTA" processing refers to a distance of the pig device from the arrival terminal equal to 4.5 km. The peaks correspond to the signal generated by the pig device in the passage through the weldings. The time window is 200 seconds;

FIG. 8 shows, for the gas pipeline of FIG. 3, the continuous cross-correlation diagram on moving time windows (2.3 minutes with an overlap of 0.3 minutes) between the sound pressure signals acquired by the measurement station positioned in the terminal of Messina (Sicily) and those acquired in the terminal of Favazzina (Calabria) during an inspection campaign of the pipeline using a pig device. The maximum correlation (continuous line) identifies the position of the pig device during the route between the terminals of Messina and Favazzina. The horizontal axis represents the distance (in km) from the terminal of Messina calculated using the sound propagation speed in the pressurized natural gas;

FIG. 9 shows the reprocessing diagrams of the cross-correlation signals of FIG. 8. In particular, FIG. 9 illustrates the diagram as a function of time of the position of the pig device from the starting terminal (above) and the diagram of the advance speed, ranging from 0.5 to 2.5 m/sec (below);

FIG. 10 shows the localization diagram of the position of two pig devices during an inspection of the oil pipeline of FIG. 5, wherein a first pig device advances continuously from the station of Gaeta towards Pomezia, with two stops at the substations VLM7 and VL9, whereas a second pig device advances continuously from Gaeta and stops at the substation VLM7;

FIG. 11 is a spectrogram of the pressure signal at the arrival terminal (Sicily) of the gas pipeline of FIG. 2 during the approach phase of a pig device (above), with the relative signal as a function of time (below). The vertical lines correspond to the signal generated by the pig device during the passage through the weldings;

FIG. 12 is a diagram which shows the amplitude, measured in dB and on the basis of various frequencies (bands of 5 Hz), of the pressure signal in correspondence with the arrival terminal (Sicily) of the gas pipeline of FIG. 2 during the approach phase of a pig device;

FIG. 13 illustrates the sound pressure signal in correspondence with the arrival terminal (Sicily) of the gas pipeline of FIG. 2 during the approach phase of a pig device. More specifically, at the top left the absolute value of the signal (pressure) is shown, at the bottom left the pressure variations are shown and in the centre right there is an enlargement of the diagram of the pressure variations. At the moment corresponding to the sound pressure anomaly (highlighted area at the bottom right) there was a failure of the inspection pig device, with the dispersion of some metallic parts in the pipeline. The subsequent cleaning pig device, arrived at the terminal (Sicily), shows the metallic parts collected and corresponding to the damaged parts of the previous pig device (top right);

FIG. 14 shows, for the gas pipeline of FIG. 3, the continuous cross-correlation diagram on sliding time windows between the sound pressure signals acquired by the measurement station positioned in the terminal of Messina (Sicily) and those acquired in the terminal of Favazzina (Calabria) during a further inspection campaign of the gas pipeline using a pig device; and FIG. 15 shows the re-processing diagrams of the cross-correlation signals of FIG. 14. In particular, FIG. 15 illustrates the diagram as a function of time of the position of the pig device from the starting terminal (above) and the diagram of the advance speeds (below), wherein both diagrams are compared with the corresponding diagrams obtained starting from the measurements registered by the instrumentation onboard the pig device.

Figure 1:
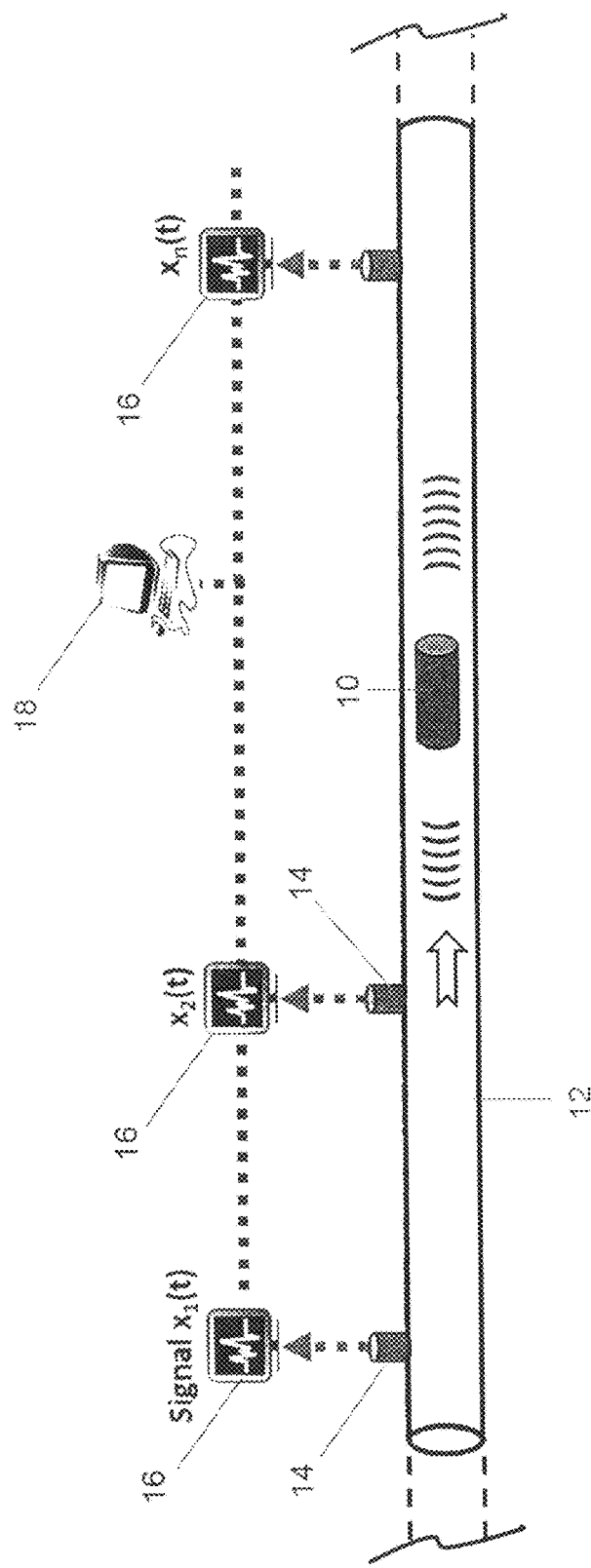
FIG. 1 is a schematic view which illustrates the application of the method and system according to the invention for measuring the pressure waves generated by a pig device in movement along a generic underwater pipeline for the transportation of fluids.

With reference to FIG. 1, this shows a method and system for the continuous remote monitoring, in passive mode, of the position and advance speed of a pig device according to the present invention. The pig device, indicated as a whole with the reference number 10, is configured for moving inside a generic pipeline 12 due to the pressure of the fluid transported by the pipeline 12 itself. The fluid can consist, for example, of natural gas, crude oil, refined oil products or water. The pipeline 12 is, in turn, composed of a plurality of pipe sections joined to each other by welding.

The method according to the invention envisages the continuous remote registration of the vibroacoustic signals and noise generated by the pig device 10 during contact/friction with the weldings and/or with other variations in the internal section of the pressurized pipeline 12. The vibroacoustic signals are also analyzed to identify and localize possible anomalies in the pig device 10 that have arisen during the inspection of the pipeline 12.

The system according to the invention comprises the installation of a plurality of measurement stations 14 equipped with vibroacoustic sensors (hydrophones, accelerometers, geophones, etc.) and located discretely along the pipeline 12, also at a distance of tens of kilometers between pairs of adjacent measurement stations 14. Each measurement station 14 registers the vibroacoustic signals due to the hydraulic pressure transients, and/or the vibrations generated by the pig device 10 in movement in the contact/friction phases on the welding seams, and/or with other physical variations (ovalizations, deformations, deposits and corrosion) present locally in the numerous pipe sections of the pipeline 12.

The vibroacoustic signals emitted inside the pipeline 12 and registered by the various measurement stations 14 are synchronized temporally with an absolute time reference system 16, such as, for example, a global satellite navigation system (GNSS or GPS), and are then sent to a centralized control unit 18 for multichannel processing (FIG. 1). The analysis of these vibroacoustic signals provides the base elements for implementing the method according to the invention.

The detection distance of the vibroacoustic signals depends on the attenuation of said vibroacoustic signals which propagate inside the pipeline 12, the dynamic sensitivity of the hydrophonic measurement sensors and the bandwidth of the measurement instrumentation (frequency range: 0.1-10 Hz). With the use of vibroacoustic measurement equipment suitable for the purpose, in pipelines 12 for the transportation of gas/oil having an average diameter of about 20", the detection distance of the pig device 10 can reach about 30 km from the measurement point. With an increase in the diameter of the pipeline 12 and pressure of the fluid, the remote detection distance of the pig device 10 increases to up to about 50 km from the measurement point.

For implementing and verifying the method and system according to the invention, some vibroacoustic measurement campaigns were performed on off-shore and on-shore pipelines in service for the transportation of natural gas (FIGS.

Figure 4:
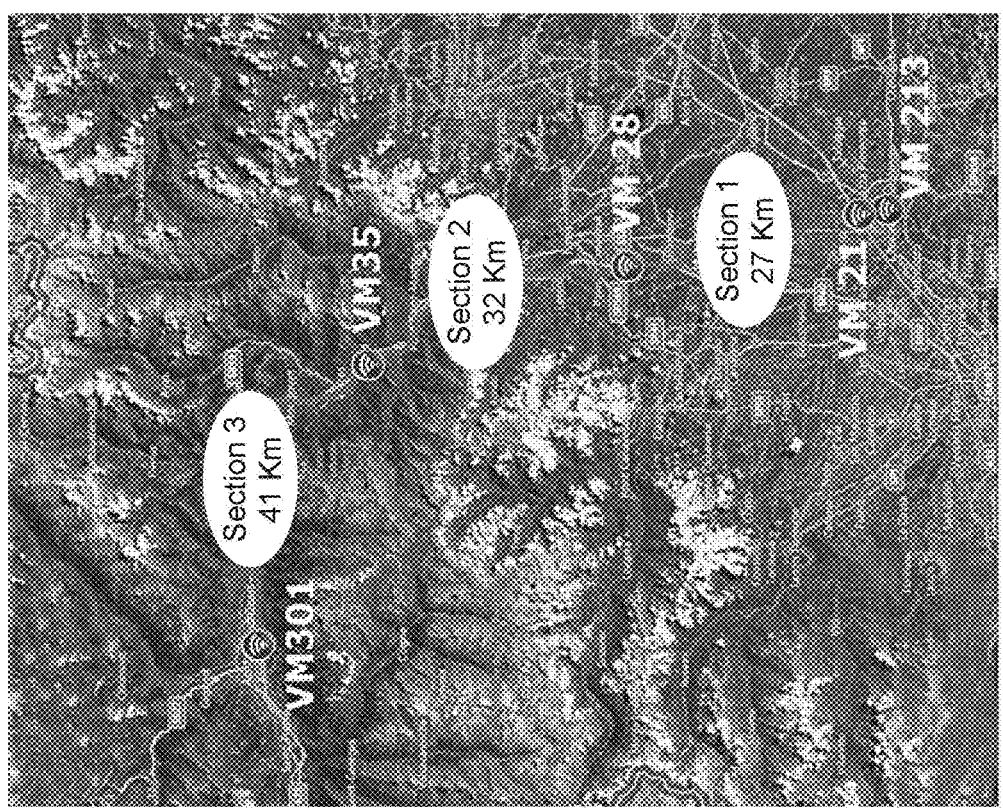
FIG. 4 shows a map and layout of a pipeline for the transportation of crude oil between Chivasso and Aosta, with pipelines having a diameter of 16" and with a length equal to 100 km.

2 and 3), crude oil (FIG. 4) and refined oil products (FIG. 5). In particular, sound pressure signals were collected in various positions along the high-pressure pipelines during the transportation of natural gas (about 100 bar), crude oil and refined oil products (about 30 bar) during some inspection and cleaning phases.

The method according to the invention envisages two distinct localization procedures of the pig device 10 inside the pipeline 12, which can be independently and/or jointly implemented.

The first procedure (count of the sound peaks) requires having data available relating to the linear position of the welding seams along the pipeline 12, which derives from the length of each single section of pipe (typically equal to 12 meters) which composes the pipeline 12 itself, in addition to data relating to possible variations and/or anomalies of the internal section of the pipeline 12. In particular, the vibroacoustic signals registered by at least one measurement station 14 positioned at a suitable distance from the pig device 10 for receiving the signals generated by the movement of the pig device 10 itself, are acquired and processed. The data available allow the detection and the localization of the hydraulic/acoustic transients produced by the pig device 10 during its passage through the above section variations, to be revealed, identified and referenced (FIGS. 6 and 7). The identification of the pressure peaks generated by the pig device 10 while passing through said welding seams can be obtained, for example, by calculating the "Short Term Average over Long Term Average" (STA-LTA) of the vibroacoustic signal registered by a single measurement station 14 and the definition of a threshold value on the resulting signal, thus enabling the count of the welding seams (FIG. 7).

Defining x(n) the $n^{th}$ sample of the vibroacoustic signal registered by the single measurement station 14 and sampled at the time instant nT (with T equal to the sampling period and n an integer), the signal STA-LTA is obtained as:

$$STA - LTA(n) = \frac{\left[\sum_{i=n}^{n+m} |x(i)|\right]}{\left[\sum_{i=k}^{n+k} |x(i)|\right]}$$

wherein n, m, k are integers which define the duration of the time window and m<k. In the exemplificative diagram of FIG. 7 (underwater gas pipeline of FIG. 2) the parameters m and k respectively correspond to a duration of 5 and 20 seconds. The movement speed of the pig device 10 along the pipeline 12 is obtained continuously and remotely, as a ratio between the section of pipe traversed by the pig device 10 (count of the sound peaks) and the time that has elapsed between the peaks under examination.

The second procedure (cross-correlation on sliding time windows) does not require a knowledge of the linear position of the welding seams along the pipeline 12. The linear position of the pig device 10 during the inspection of the pipeline 12 is calculated continuously by the analysis of the cross-correlation on sliding time windows between the vibroacoustic signals generated by the same pig device 10 and registered by at least two measurement stations 14 installed along the pipeline 12, of which a first measurement station 14 is situated on a first side of the pipeline 12 with respect to the position of the pig device 10 in movement and the second measurement station is situated on the opposite side of the pipeline 12 with respect to the position of said pig device 10 in movement (FIG. 1). The time instant of maximum correlation between the vibroacoustic signals is equal to the difference in the arrival times at said two measurement stations 14 under examination, of the hydraulic/acoustic transients generated by the pig device 10. The time is converted to distance by exploiting (known) information on the sound propagation speed in the fluid (gas or liquid) inside the pressurized pipeline 12.

With reference to the scheme of FIG. 1 and calling $x_2(n)$ and $x_3(n)$, the $n^{th}$ sample of the vibroacoustic signals registered by two measurement stations 14 positioned on opposite sides of the pig device 10 in movement, sampled at the time instant nT (with T equal to the sampling period and n an integer), the normalized cross-correlation $x_c(n)$ on a sliding time window is obtained as:

$$x_c(n) = \frac{\sum_{i=k}^{k+m} x_2(i)x_3(n+i)}{\sqrt{\sum_{i=k}^{k+m} [x_2(i)]^2 \sum_{i=k}^{k+m} [x_3(i)]^2}}$$

with m an integer which defines the duration of the time window.

In the exemplificative diagram of FIG. 8 (underwater gas pipeline between Messina and Favazzina of 15.9 km), the correlations are calculated on time windows of 3.2 minutes, with an overlap of 0.2 minutes. The movement speed of the pig device 10 along the pipeline 12 is obtained continuously and remotely, following the correlation peak along the time and calculating the ratio between the space covered by the pig device 10 and the relative elapsed time (FIG. 9).

For both procedures, if the pig device 10 interrupts its advancement, there are no longer vibroacoustic signals produced by the passage through the section anomalies (welding seams) and the procedures described provide the position of the last detection, whereas the advance speed of the same pig device 10 becomes null.

The method according to the invention also comprises obtaining the sound propagation parameters (speed and attenuation) in the various sections of pipe of the pipeline 12 through the processing of composite signals, evaluating, for example, the correlation of the vibroacoustic measurements between adjacent measurement stations 14. The signal to be processed consists, in this case, of both the acoustic noise generated by the pig device 10 during the inspection route in the pipeline 12, and by pressure variations in the fluid connected to the variability of the pressure regime of the pumps/compressors (see international patent application PCT/EP2013/077116 in the name of the same applicant).

A further specific feature of the method according to the invention is to perform a continuous analysis of the statistical type, of the waveforms (for example amplitude, energy, bandwidth and frequency centroid) produced during the passages of the pig device 10 through the welding seams between the sections of pipe forming the pipeline 12 and the possible variations and/or anomalies of the internal section of said pipeline 12, also considering the different sound attenuation due to the different propagation distances (FIG. 11 and FIG. 12). The sound propagation model, which comprises the calculation of the speed and attenuation in the fluid, is continuously acquired and updated experimentally (see international patent application PCT/EP2013/077116 in the name of the same applicant).

The statistical analysis of the waveforms emitted within certain acceptability thresholds, for example by the training and use of neural networks, allows anomalous events to be identified and localized along the pipeline 12, due to malfunctioning of the pig device 10 and/or variations in the section inside the pipeline 12 itself.

It can thus be seen that the method and system for the continuous remote monitoring of inspection or pigging operations of pipelines used for transporting pressurized fluids according to the present invention achieve the objectives previously indicated.

The method and system for the continuous remote monitoring of inspection or pigging operations of pipelines used for transporting pressurized fluids according to the present invention thus conceived can in any case undergo numerous modifications and variants, all included in the same inventive concept. The protection scope of the invention is therefore defined by the enclosed claims.

The invention claimed is:

1. A method for the continuous remote monitoring of a position and advance speed of a pig device inside a pipeline suitable for transporting a pressurized fluid, wherein the pipeline includes a plurality of pipe sections joined to each other by welding seams, the method comprising the following:
   continuously acquiring and recording, by a plurality of measurement stations equipped with vibroacoustic sensors discretely located along the pipeline, of vibroacoustic signals due to the vibrations generated by contact/friction of the pig device with the welding seams of the pipeline and/or with other physical variations locally present in multiple pipe sections of the pipeline;
   analyzing and processing, by processing circuitry, the vibroacoustic signals registered by the measurement stations to reveal, identify and reference hydraulic/acoustic transients produced by the pig device as a result of contact/friction with the welding seams and/or with other variations of an internal section of the pipeline; and
   continuously determining the linear position and advance speed of the pig device in relation to a time lapse between the vibroacoustic signals registered by at least two measurement stations installed along the pipeline,
   wherein the determining of the linear position and advance speed of the pig device is performed by a first measurement station situated on a first side of the pipeline with respect to the position of the moving pig device and a second measurement station situated on the opposite side of the pipeline with respect to the position of said moving pig device, and
   wherein the linear position and advance speed of the pig device are determined by analysis of cross-correlation on sliding time windows between the vibroacoustic signals registered by said two measurement stations installed along the pipeline, wherein a time instant of maximum correlation between the vibroacoustic signals is equal to a difference in the arrival times at said two measurement stations of the hydraulic/acoustic transients generated by the pig device and wherein the time is converted to distance by using known information on sound propagation speed in the fluid transported by the pipeline.

2. The method according to claim 1, wherein the vibroacoustic signals emitted inside the pipeline and registered by the measurement stations are temporally synchronized through an absolute time reference system.

3. The method according to claim 1, further comprising:
   acquiring data relating to the linear position of the welding seams between the pipe sections forming the pipeline and data relating to possible variations and/or anomalies on the internal section of the pipeline.

4. The method according to claim 1, wherein the identification of pressure peaks generated by the pig device while passing through the welding seams between the pipe sections forming the pipeline and the data relating to possible variations and/or anomalies of the internal section of the pipeline are obtained by calculating the Short Term Average over Long Term Average (STA-LTA) of the vibroacoustic signal recorded by a single measurement station and a definition of a threshold value on the resulting signal.

5. The method according to claim 4, wherein the calculation of the STA-LTA of the vibroacoustic signal is performed through the following equation:

$$STA-LTA(n) = \frac{\left[\sum_{i=n}^{n+m} |x(i)|\right]}{\frac{\left[\sum_{i=k}^{n+k} |x(i)|\right]}{k}}$$

wherein x(n) is the n-th sample of the vibroacoustic signal registered by a single measurement station and sampled at the time instant nT, with T equal to the sampling period, and n, m, k are parameters consisting of integers which define the duration of the time window and m<k.

6. The method according to claim 5, wherein the calculation of the normalized cross-correlation $x_c(n)$ on a sliding time window is performed through the following equation:

$$x_c(n) = \frac{\sum_{i=k}^{k+m} x_2(i) x_3(n+i)}{\sqrt{\sum_{i=k}^{k+m} [x_2(i)]^2 \sum_{i=k}^{k+m} [x_3(i)]^2}}$$

wherein $x_2(n)$ and $x_3(n)$ are the n-th sample of the vibroacoustic signals registered by two measurement stations positioned on opposite sides of the pig device, sampled at the time instant nT, with T equal to the sampling period, and n, m, k are integers which define the duration of the time window.

7. The method according to claim 6, wherein the movement speed of the pig device along the pipeline is obtained continuously as a ratio between a section of pipe traversed by the pig device and the time that has elapsed between two consecutive assessments of the vibroacoustic signals.

8. The method according to claim 1, further comprising:
   obtaining sound propagation parameters, including speed and attenuation, in various pipe sections of the pipeline by processing composite signals; and
   evaluating a correlation of the vibroacoustic measurements between adjacent measurement stations, wherein the signal to be processed includes both the acoustic noise generated by the pig device moving along the pipeline and pressure variations in the fluid.

9. The method according to claim 1, further comprising:
continuously analyzing a statistical type of waveforms relating to passages of the pig device through the welding seams between the pipe sections forming the pipeline and possible variations and/or anomalies of the internal section of said pipeline, and different sound attenuation due to various propagation distances, wherein a sound propagation model, which includes calculation of the sound speed and attenuation in the fluid, is continuously acquired and experimentally updated.

10. The method according to claim 1, further comprising:
identifying anomalies of the welding seams and/or the pig device based on the analyzing and determining.

11. The method according to claim 1, further comprising:
identifying anomalies of the welding seams and the pig device based on the analyzing and determining.

12. A system for the continuous remote monitoring of a position and advance speed of a pig device inside a pipeline suitable for transporting a pressurized fluid, wherein the pipeline includes a plurality of pipe sections joined to each other by welding seams, the system comprising:
a plurality of measurement stations equipped with vibroacoustic sensors discretely located along the pipeline, wherein each measurement station registers the vibroacoustic signals due to the vibrations generated by contact/friction of the pig device with the welding seams and/or to other physical variations locally present in the multiple pipe sections of the pipeline; and
processing circuitry operatively connected to said plurality of measurement stations and configured to:
analyze and process the vibroacoustic signals registered by the measurement stations to reveal, identify and reference hydraulic/acoustic transients produced by the pig device as a result of contact/friction with weldings and/or with other variations of internal sections of the pipeline, and
continuously determine a linear position and advance speed of the pig device in relation to a time lapse between the vibroacoustic signals registered by at least two measurement stations installed along the pipeline,
wherein determination of the linear position and advance speed of the pig device is performed by a first measurement station situated on a first side of the pipeline with respect to the position of the moving pig device and a second measurement station situated on the opposite side of the pipeline with respect to the position of said moving pig device, and
wherein the linear position and advance speed of the pig device are determined by analysis of cross-correlation on sliding time windows between the vibroacoustic signals registered by said two measurement stations installed along the pipeline, wherein a time instant of maximum correlation between the vibroacoustic signals is equal to a difference in the arrival times at said two measurement stations of the hydraulic/acoustic transients generated by the pig device and wherein the time is converted to distance by using known information on sound propagation speed in the fluid transported by the pipeline.

13. The system according to claim 12, wherein the measurement stations are operatively connected through an absolute time reference system for temporally synchronizing the vibroacoustic signals emitted inside the pipeline and registered by said measurement stations.

14. The system according to claim 12, wherein said vibroacoustic sensors include at least one of hydrophones, accelerometers and geophones.

15. A method for the continuous remote monitoring of a position and advance speed of a pig device inside a pipeline suitable for transporting a pressurized fluid, wherein the pipeline includes a plurality of pipe sections joined to each other by welding seams, the method comprising the following:
continuously acquiring and recording, by a plurality of measurement stations equipped with vibroacoustic sensors discretely located along the pipeline, of vibroacoustic signals due to the vibrations generated by contact/friction of the pig device with the welding seams of the pipeline and/or with other physical variations locally present in multiple pipe sections of the pipeline;
analyzing and processing, by processing circuitry, the vibroacoustic signals registered by the measurement stations to reveal, identify and reference hydraulic/acoustic transients produced by the pig device as a result of contact/friction with the welding seams and/or with other variations of an internal section of the pipeline;
continuously determining the linear position and advance speed of the pig device in relation to a time lapse between the vibroacoustic signals registered by at least two measurement stations installed along the pipeline; and
acquiring data relating to the linear position of the welding seams between the pipe sections forming the pipeline and data relating to possible variations and/or anomalies on the internal section of the pipeline,
wherein the identification of pressure peaks generated by the pig device while passing through the welding seams between the pipe sections forming the pipeline and the data relating to possible variations and/or anomalies of the internal section of the pipeline are obtained by calculating the Short Term Average over Long Term Average (STA-LTA) of the vibroacoustic signal recorded by a single measurement station and a definition of a threshold value on the resulting signal,
wherein the determining of the linear position and advance speed of the pig device is performed by a first measurement station situated on a first side of the pipeline with respect to the position of the moving pig device and a second measurement station situated on the opposite side of the pipeline with respect to the position of said moving pig device, and
wherein the linear position and advance speed of the pig device are determined by analysis of cross-correlation on sliding time windows between the vibroacoustic signals registered by said two measurement stations installed along the pipeline, wherein a time instant of maximum correlation between the vibroacoustic signals is equal to a difference in the arrival times at said two measurement stations of the hydraulic/acoustic transients generated by the pig device and wherein the time is converted to distance by using known information on sound propagation speed in the fluid transported by the pipeline.

* * * * *